(12) United States Patent
Chin et al.

(10) Patent No.: US 7,385,178 B2
(45) Date of Patent: Jun. 10, 2008

(54) REFLECTIVE ENCODERS WITH VARIOUS EMITTER-DETECTOR CONFIGURATIONS

(75) Inventors: Yee Loong Chin, Perak (MY); Siang Leong Foo, Penang (MY); Weng Fei Wong, Penang (MY); Saiful Bahari Bin Saidan, Selangor (MY); Cheng Why Tan, Penang (MY); Wee Jin Yeap, Penang (MY)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 130 days.

(21) Appl. No.: 11/259,419

(22) Filed: Oct. 26, 2005

(65) Prior Publication Data

US 2007/0090282 A1 Apr. 26, 2007

(51) Int. Cl.
*G01D 5/34* (2006.01)

(52) U.S. Cl. .................. 250/231.14; 250/231.13; 250/231.18; 356/616; 356/617

(58) Field of Classification Search ............... 250/ 231.13–231.18; 356/616–617; 33/1 PT, 33/1 N, 1 L; 341/11, 13
See application file for complete search history.

(56) References Cited

U.S. PATENT DOCUMENTS

| | | | |
|---|---|---|---|
| 4,193,199 A | 3/1980 | Whiteley | |
| 4,224,514 A | 9/1980 | Weber | |
| 4,717,824 A | 1/1988 | Sakamoto et al. | |
| 4,736,187 A | 4/1988 | Kibrick | |
| 4,929,822 A | 5/1990 | Nakamura et al. | |
| 4,983,828 A | 1/1991 | Stephens | |
| 4,987,301 A | 1/1991 | Nakamura | |
| 5,006,703 A | 4/1991 | Shikunami et al. | |
| 5,266,797 A | 11/1993 | Zuefferey | |
| 5,317,149 A * | 5/1994 | Uebbing et al. | 250/231.14 |
| 5,808,730 A | 9/1998 | Danielian | |
| 5,825,307 A | 10/1998 | Titus | |
| 6,215,119 B1 | 4/2001 | Markham | |
| 6,528,779 B1 | 3/2003 | Franz | |
| 6,713,756 B2 * | 3/2004 | Yamamoto et al. | 250/231.13 |
| 6,740,862 B2 * | 5/2004 | Paritsky et al. | 250/221 |
| 6,803,560 B1 | 10/2004 | Okumura et al. | |
| 6,975,408 B2 * | 12/2005 | Igaki et al. | 356/616 |
| 2001/0013765 A1 | 8/2001 | Yamamoto et al. | |
| 2003/0193016 A1* | 10/2003 | Chin et al. | 250/231.13 |
| 2004/0004181 A1 | 1/2004 | Ohmura | |
| 2005/0087681 A1 | 4/2005 | Chin et al. | |
| 2006/0016970 A1* | 1/2006 | Nagasaka et al. | 250/231.13 |

FOREIGN PATENT DOCUMENTS

| | | |
|---|---|---|
| EP | 0597705 | 5/1994 |
| EP | 0881469 | 2/1997 |

(Continued)

OTHER PUBLICATIONS

UK Search Report dated Mar. 12, 2007 involving counterpart UK Application No. GB0621258.3.

*Primary Examiner*—Davienne Monbleau (57) ABSTRACT

Optical encoders having one or more of a number of disclosed features are disclosed. The features of the optical encoder in accordance with the present invention include a symmetrical (for example, circular) emitter; baffle between the emitter and a detector; double-dome or single-dome encapsulant; multiple detector; and multiple (at least three) data channels.

17 Claims, 5 Drawing Sheets

FOREIGN PATENT DOCUMENTS

| | | |
|---|---|---|
| GB | 2056660 | 3/1981 |
| GB | 2192271 | 1/1988 |
| GB | 2204680 | 11/1988 |
| GB | 2 369 184 A | 5/2002 |
| GB | 2 386 416 A | 9/2003 |
| GB | 2429858 | 3/2007 |
| JP | 57-149912 A | 9/1982 |
| JP | 58-184549 A | 10/1983 |
| JP | 59-195118 A | 11/1984 |
| JP | 59-224514 A | 12/1984 |
| WO | WO 01/73379 A1 | 10/2001 |
| WO | WO-03/021194 | 3/2003 |

\* cited by examiner

REFLECTIVE ENCODERS WITH VARIOUS EMITTER-DETECTOR CONFIGURATIONS

BACKGROUND

The present invention relates generally to optical encoders. More particularly, the present invention relates to optical encoders having various orientations.

Optical encoders detect motion and typically provide closed-loop feedback to a motor control system. When operated in conjunction with a code scale, an optical encoder detects motion (linear or rotary motion of the code scale), converting the detected motion into digital signal that encode the movement, position, or velocity of the code scale. Here, the phrase "code scale" includes code wheels and code strips.

Usually, motion of the code scale is detected optically by means of an optical emitter and an optical detector. The optical emitter emits light impinging on and reflecting from the code scale. The reflected light is detected by the optical detector. A typical code scale includes a regular pattern of slots and bars that reflect light in a known pattern.

Figure 1A:
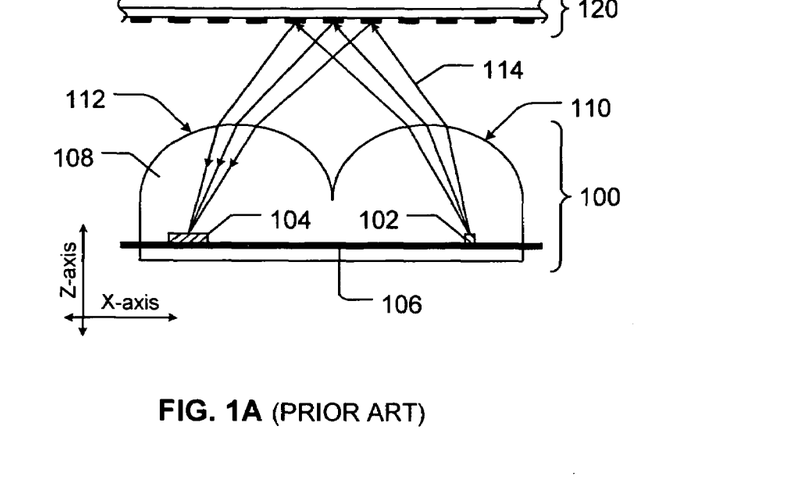
FIGS. 1A and 1C illustrate differing views of a prior art optical encoder and a sample code scale.
Figure 1B:
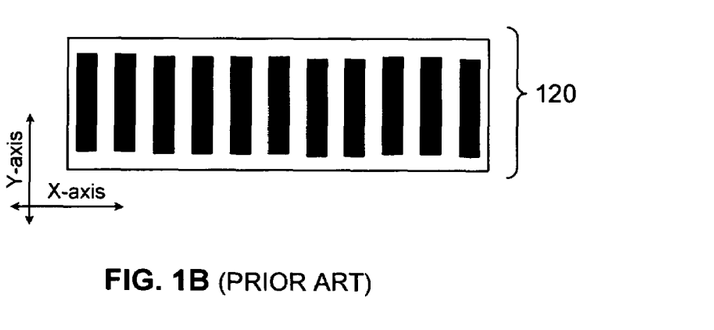
FIG. 1B illustrates the sample code scale of FIG. 1A as viewed from the optical encoder of FIGS. 1A and 1C.
Figure 1C:
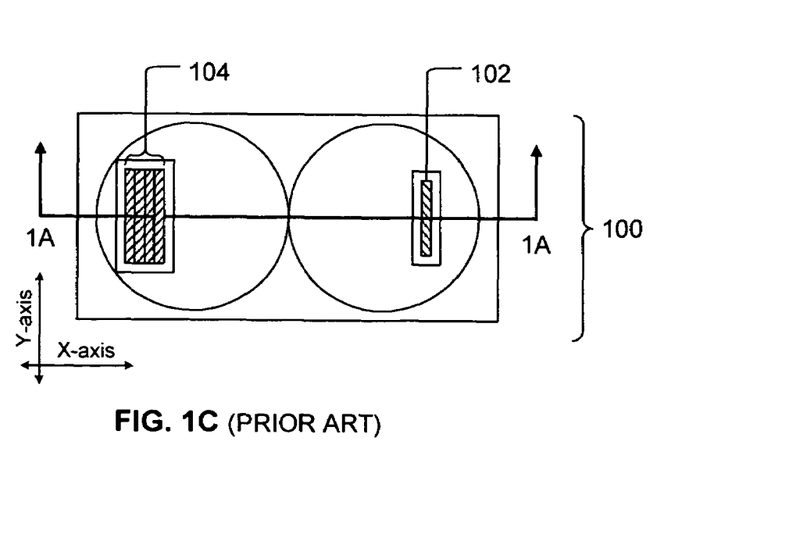

FIGS. 1A through 1C illustrate a known optical encoder 100 and a code scale 120. FIG. 1A is a cutaway side view of the optical encoder 100 and the code scale 120. FIG. 1B is the code scale 120 as viewed from the optical encoder 100. FIG. 1C is the optical encoder 100 as viewed from the optical encoder 100.

FIGS. 1A through 1C include orientation axes legend for even more clarity.

Referring to FIGS. 1A through 1C, the encoder 100 includes an optical emitter 102 and an optical detector 104 mounted on a substrate 106 such as a lead frame 106. The optical emitter 102 and the optical detector 104 as well portions of the lead frame 106 are encapsulated in an encapsulant 108 including, for example, clear epoxy. The encapsulant 108 defines a first dome-shaped surface 110 (first lens 110) over the optical emitter 102 and a second dome-shaped surface 112 (second lens 112) over the optical detector 104.

The optical emitter 102 emits light that leaves the encapsulant 108 via the first lens 110. The first lens 110 concentrates or otherwise directs the light toward the code scale 120, the light reflecting off of the code scale 120. The reflected light reaches the optical detector 104 via the second lens 112. The second lens 112 concentrates or otherwise directs the reflected light toward the optical detector 104. The optical detector 104 can be, for example only, photo detector that converts light into electrical signals.

In the illustrated example, the optical emitter 102 is a slit-type light emitter, the slit along the Y-axis. As illustrated, the optical detector 104 is placed along the Y-axis. Further, the slots and bars of the code scale 120 runs along the Y-axis.

Accordingly, the optical encoder 100 and the code scale 120 are oriented and positioned relative to each other in order to detect movements of the code scale 120 in the X-axis direction.

This design has several weaknesses. For example, the optical encoder 100 is sensitive to misalignments. Even slight misalignments of the slit emitter 102 lead to contrast degradation, thus degradation of the performance of the optical encoder 100. Further, the optical encoder 100 detects movements in only one direction (for example, along the X-axis direction in the illustrated example), limiting flexibility in orientation of the encoder package. Moreover the existing optical encoder has limited number (typically at most two) of data channels on one side of the emitter.

Accordingly, there remains a need for improved optical encoder that alleviates or overcomes these shortcomings.

SUMMARY

The need is met by the present invention. In a first embodiment of the present invention, an optical encoder includes an emitter and a detector. The emitter is adapted to emit light in a circular pattern wherein the emitter operable to provide light to a code scale for reflection. The detector is adapted to detect reflected light from the code scale.

In a second embodiment of the present invention, an optical encoder includes an emitter, a detector, and encapsulant. The emitter is adapted to emit light, the emitted light directed toward a code scale for reflection. The detector is adapted to detect reflected light from the code scale. The encapsulant encapsulating the emitter and the detector, the encapsulant forming a single dome over the emitter and the detector.

In a third embodiment of the present invention, an optical encoder includes an emitter, a detector, and a baffle between the emitter and the detector. The emitter is adapted to emit light, the emitted light directed toward a code scale for reflection. The detector is adapted to detect reflected light from the code scale.

The baffle between the emitter and the detector prevents stray light from the emitter from reaching the detector.

In a fourth embodiment of the present invention, an optical encoder includes an emitter, a detector, and an index detector. The emitter is adapted to emit light, the emitted light directed toward a code scale. The detector is adapted to detect light reflected from the code scale. The detector provides two data channels. The index detector provides an index channel.

Other aspects and advantages of the present invention will become apparent from the following detailed description, taken in conjunction with the accompanying drawings, illustrating by way of example the principles of the invention.

DETAILED DESCRIPTION

The present invention will now be described with reference to the Figures which illustrate various embodiments of the present invention. In the Figures, some sizes of structures or portions may be exaggerated and not to scale relative to sizes of other structures or portions for illustrative purposes and, thus, are provided to illustrate the general structures of the present invention. Furthermore, various aspects of the present invention are described with reference to a structure or a portion positioned "on" or "above" relative to other structures, portions, or both.

Relative terms and phrases such as, for example, "on" or "above" are used herein to describe one structure's or portion's relationship to another structure or portion as illustrated in the Figures. It will be understood that such relative terms are intended to encompass different orientations of the device in addition to the orientation depicted in the Figures.

For example, if the device in the Figures is turned over, rotated, or both, the structure or the portion described as "on" or "above" other structures or portions would now be oriented "below," "under," "left of," "right of," "in front of," or "behind" the other structures or portions. References to a structure or a portion being formed "on" or "above" another structure or portion contemplate that additional structures or portions may intervene. References to a structure or a portion being formed on or above another structure or portion without an intervening structure or portion are described herein as being formed "directly on" or "directly above" the other structure or the other portion. Same reference number refers to the same elements throughout this document.

Symmetrical Emitter

Referring again to FIG. 1A, the optical emitter 102 is a slit emitter that emits light in an elongated oval shape, or a slit. In this design, performance of the optical encoder 100 is sensitive to slight misalignment errors of emitter relative to the code scale 120. To reduce the misalignment sensitivity, an emitter having symmetrical radiation pattern can be used as illustrated in FIGS. 2A and 2B.

Figure 2A:
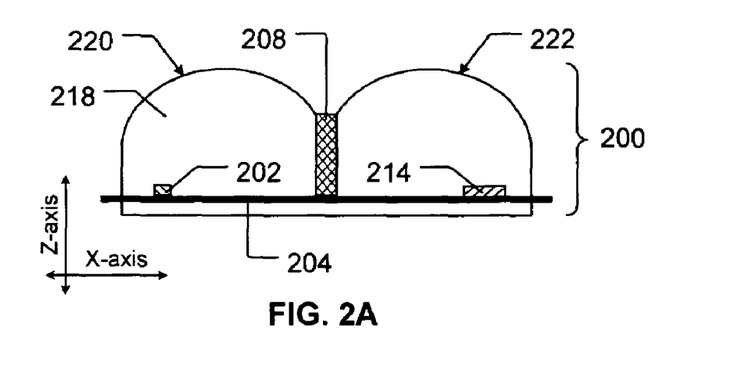
FIGS. 2A and 2B illustrate differing views of an optical encoder package according to one embodiment of the present invention.
Figure 2B:
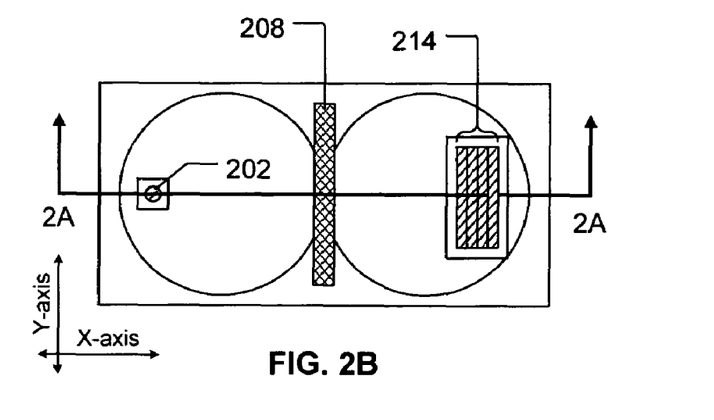

FIG. 2B is a top view of the optical encoder 200. FIG. 2A is a cutaway side view of the optical encoder 200 cut along line 2A-2A of FIG. 2B. FIGS. 2A and 2B illustrate an optical encoder package 200 according to one embodiment of the present invention.

Figure 2C:
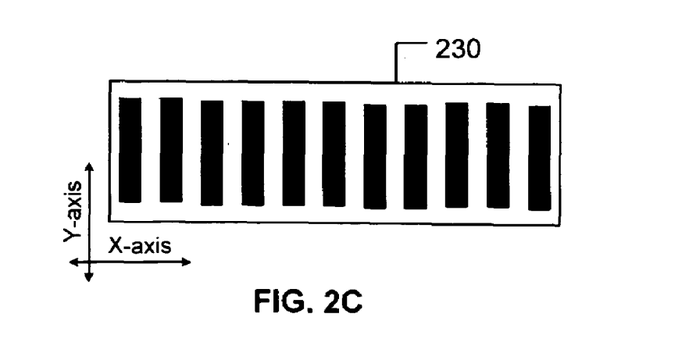
FIG. 2C illustrates sample code scales as viewed from the optical encoder package of FIGS. 2A and 2B.

Referring to FIGS. 2A and 2C, the optical encoder 200 includes a symmetrical emitter 202 (for example, an LED (light emitting diode)) adapted to provide light in a symmetrical (for example, circular) pattern viewed from the top. The symmetrical emitter 202 emits uniform, symmetrical light for reflecting off a code scale such as the code scale 230. Due to the uniformity and the symmetry of the emitted light, the optical encoder 200 is less sensitive to misalignments between the optical encoder 200 and the code scale 230 compared to the sensitivity to misalignments of the prior art encoder 100 of FIGS. 1A and 1C.

The optical encoder 200 is operable to provide light from the symmetrical emitter 202 to the code scale 230. The code scale 230 includes slots and bars in the first orientation (in the y-axis in the illustrated sample embodiment). Thus, the code scale 230 reflects light from the symmetrical emitter 202. The reflected light is detected by a detector 214 and converted to electrical signal to be translated into information representing position or motion of the code scale 230.

The symmetrical emitter 202 and the detector 214 are fabricated on the substrate 204 (for example, lead frame 204). The symmetrical emitter 202 and the detector 214 as well portions of a substrate 204 (for example, lead frame 204) are encapsulated in an encapsulant 218 including, for example, clear epoxy. Here, the encapsulant 218 defines a dual-domed surface including a first dome-shaped surface 220 (first lens 220) over the symmetrical emitter 202 and a second dome-shaped surface 222 (second lens 222) over the optical detector 214.

The symmetrical emitter 202 emits light that leaves the encapsulant 218 via the first lens 220. The first lens 220 concentrates, collimates, or otherwise directs the light toward the code scale 230, the light reflecting off of the code scale 230. The reflected light reaches the optical detector 214 via the second lens 222. The second lens 222 concentrates, collimates, or otherwise directs the reflected light toward the optical detector 214. In the illustrated example, the slots and bars of the code scale 230 runs along the Y-axis. Accordingly, the optical encoder 200 and the code scale 230 are oriented in the orientation to detect movements of the code scale 230 in the X-axis direction.

Another aspect of the optical encoder 200 is a baffle 208, or an optical barrier 208, between the optical emitter 202 and the optical detector 214. The baffle 208 prevents stray light from reaching the optical detector 214. The baffle 208 may be coated with black absorptive materials that absorb part of the undesired optical radiation thereby reducing noise caused by undesired optical radiation. For example only, the baffle 208 may include or be coated with dummy black electronic component, anodized metal, separate piece of black plastic, black absorptive epoxy, black-polymer, carbon-filled polymer, black resin, black ink marks, coats of epoxy, laser burned surfaces and other similar types of materials capable of absorbing optical radiation. The baffle 208 may be fabricated having any suitable shape such, for example only, rectangular shape or trapezoidal shape.

Single Dome

Figure 3A:
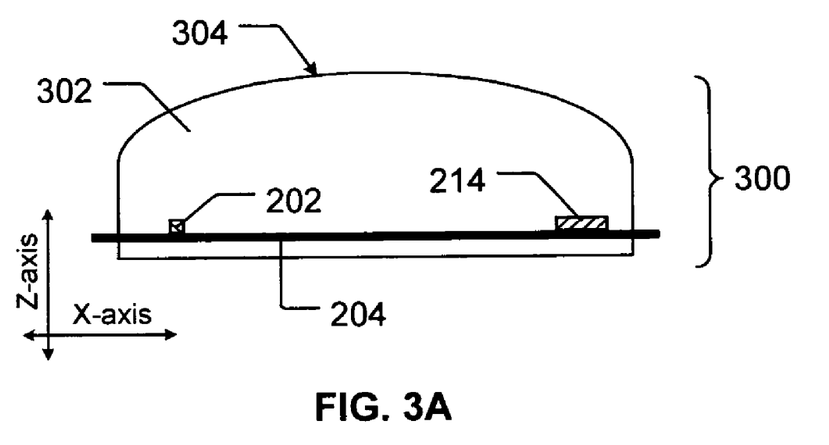
FIGS. 3A and 3B illustrate differing views of an optical encoder according to another embodiment of the present invention.
Figure 3B:
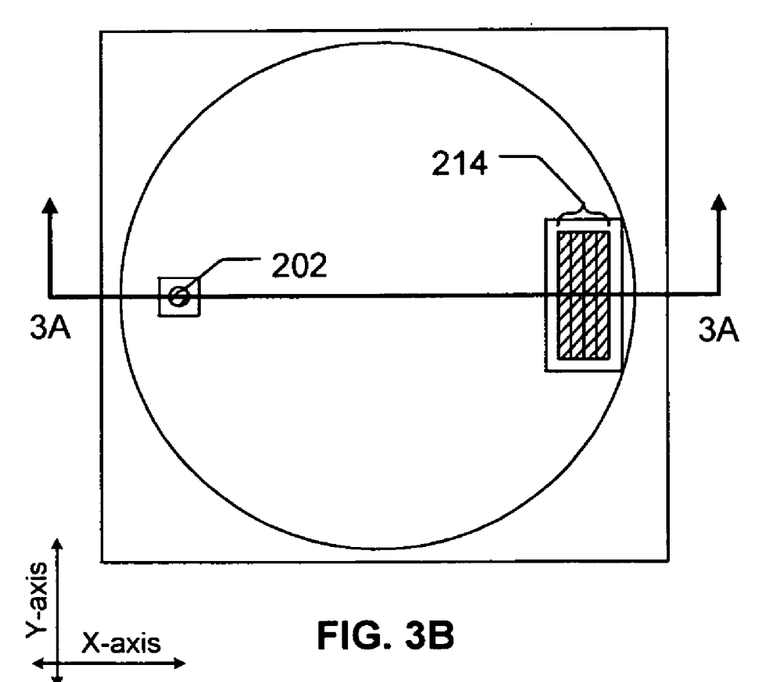

Another aspect of the present invention is illustrated in FIGS. 3A and 3B.

FIG. 3B is a top view of an optical encoder 300. FIG. 3A is a cutaway side view of the optical encoder 300 cut along line 3A-3A of FIG. 3B. Portions of the optical encoder 300 are similar to corresponding portions of the optical encoder 200 of FIGS. 2A and 2B. For convenience, the portions of the optical encoder 300 that are similar to corresponding portions of the optical encoder 200 of FIGS. 2A and 2B are assigned the same reference numerals.

Referring to FIGS. 3A and 3B, the optical encoder 300 includes an emitter 202 and a detector 214 on a substrate lead frame 204. Encapsulant 302 encapsulates the emitter 202, the detector 214, and portions of the lead frame 204. Here, the encapsulant 302 forms a single-dome 304 that covers both the emitter 202 and the detector 214. In some applications, the single-dome configuration may be more desirable than the double-domed configuration for requiring less space, complexity of manufacture, or both.

MultiChannel Encoder

Figure 4A:
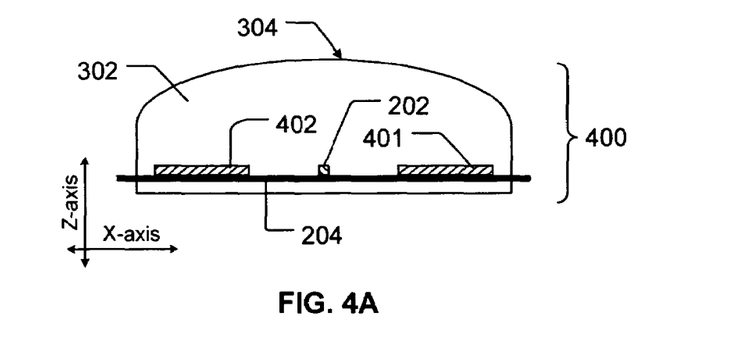
FIGS. 4A and 4B illustrate differing views of an optical encoder according to yet another embodiment of the present invention.
Figure 4B:
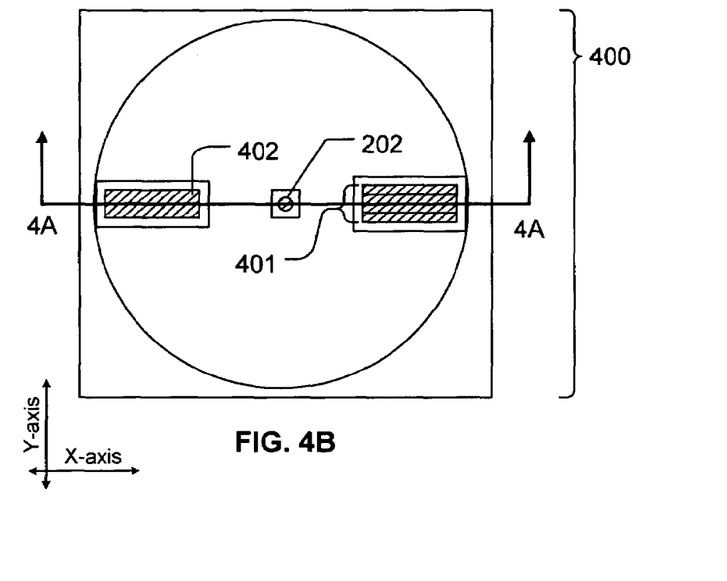

Referring again to FIGS. 1A and 1C, the optical encoder 100 typically includes the single optical detector 104 having one or at most two channels. For applications where additional channels are desired, two prior art optical encoders 100 are used. To overcome this problem, FIGS. 4A and 4B illustrate an optical encoder 400 including an optical emitter 202 and two optical detectors. FIG. 4B is a top view of an optical encoder 400. FIG. 4A is a cutaway side view of the optical encoder 400 cut along line 4A-4A of FIG. 4B.

Portions of the optical encoder 400 are similar to corresponding portions of the optical encoder 200 of FIGS. 2A and 2B, corresponding portions of the optical encoder 300 of FIGS. 3A and 3B, or both. For convenience, the portions of the optical encoder 400 that are similar to corresponding portions of the optical encoder 200 of FIGS. 2A and 2B, corresponding portions of the optical encoder 300 of FIGS. 3A and 3B, or both are assigned the same reference numerals.

Figure 4C:
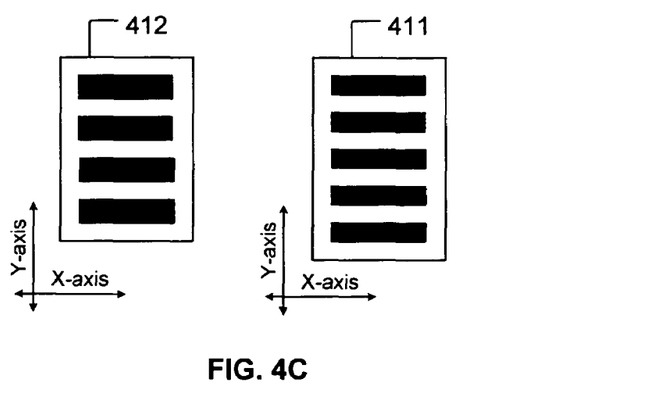
FIG. 4C illustrates sample code scales as viewed from the optical encoder package of FIGS. 4A and 4B.

Referring to FIGS. 4A and 4B, the optical encoder 400 includes an emitter 202 and a detector 401. The detector 401 can include up to two channels. The detector 401 is configured to operate with the code scale 411 of FIG. 4C. In the illustrated embodiment, the detector 401 is placed along the X-axis, lengthwise of each individual photodiode, orthogonal to the orientation which is along the Y-axis (as illustrated by FIG. 4C). This orientation is for the purposes of illustrating alternative embodiment of the present invention.

The optical encoder 400 further includes another detector 402 including another, third, channel. In the illustrated embodiment, the second detector 402 is an index detector 402 and may be configured to work with another code scale 412 illustrated in FIG. 4C. The index code scale 412 is configured to operate with the index detector 402 and may have resolution (of slots and bars) different than resolution of the code scale 411. In the illustrated embodiment, the optical encoder 400 has three channels of data—two from its first detector 401 and index channel from the index detector 402. Further, in the illustrated embodiment, the optical encoder 400 is a single-dome configuration.

Combination

In other embodiments of the present invention, various techniques and aspects of the present invention can be combined. For example, the circular emitter 202 (FIGS. 2A and 2B), the baffle 208 (FIGS. 2A and 2B), dual dome 220 and 222 construction (FIGS. 2A and 2B), single dome (304) construction (FIGS. 3A and 3B), multiple-detector/channel (401 and 402) construction (FIGS. 4A and 4B) can be combined in any combination within the scope of the present invention.

Figure 5:
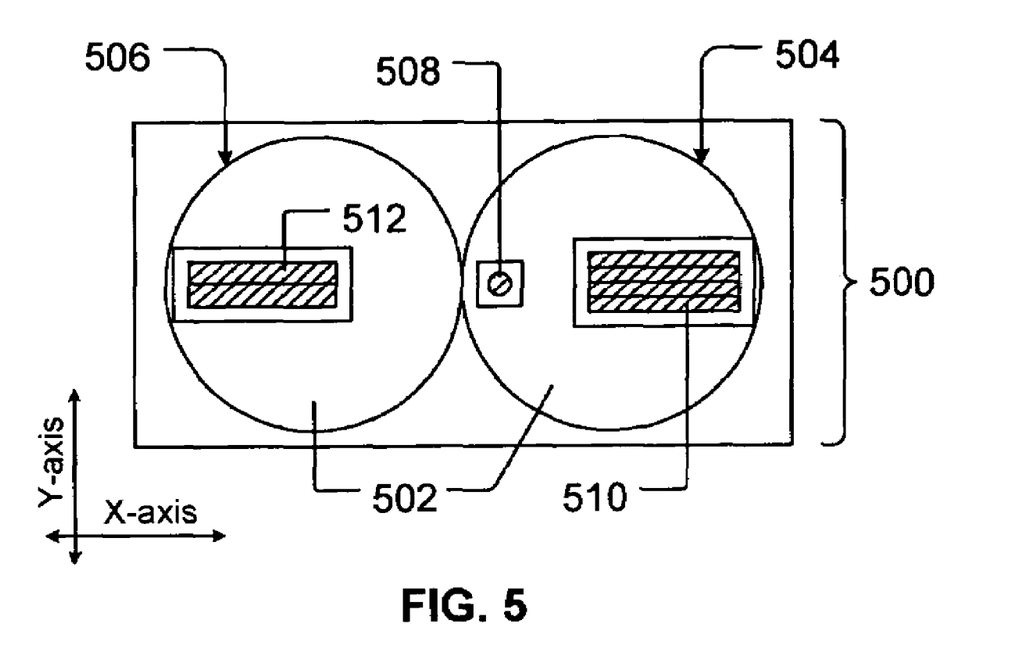
FIG. 5 illustrates an optical encoder according to yet another embodiment of the present invention.

FIG. 5 illustrates one of the combination embodiments in an optical encoder 500. Referring to FIG. 5, the optical encoder includes encapsulant 502 forming a first dome 504 and a second dome 506 in a dual-domed configuration. Here, the first-dome portion encapsulates an optical emitter 508 and a detector 510 while the second-dome portion encapsulates a second, index, detector 512. The optical emitter 508, here for instance, is a circular emitter. The optical emitter 508 can be a slit emitter, which is placed along the X-axis, lengthwise of each individual photodiode. It is apparent from FIG. 5 as well as preceding figures and discussions that positions of the emitter 508 and the detectors 510 and 512 relative to the two domes 504 and 506 can be rearranged to achieve other configuration.

Alternatively, the emitter 508 and the detectors 510 and 512 or any combination of these can be placed within encapsulant having a single dome.

CONCLUSION

From the foregoing, it will be apparent that the present invention is novel and offers advantages over the current art. Although specific embodiments of the invention are described and illustrated above, the invention is not to be limited to the specific forms or arrangements of parts so described and illustrated. For example, differing configurations, sizes, or materials may be used but still fall within the scope of the present invention. The invention is limited by the claims that follow.

What is claimed is:

1. An optical encoder comprising:
   an emitter adapted to emit light, the emitted light directed toward a code scale and an index code scale for reflection;
   a detector adapted to detect reflected light from the code scale;
   an index detector adapted to detect reflected light from the index code scale; and
   an encapsulant encapsulating said emitter, said detector, and said index detector, said encapsulant forming a double-dome surface, with one dome surface over said emitter and said detector and the other dome surface over said index detector;
   wherein the emitter is located between the detector and the index detector.

2. The optical encoder recited in claim 1 wherein said emitter is one of the following: a slit emitter, and a circular emitter.

3. The optical encoder recited in claim 1 further comprising a baffle between said emitter and said detector.

4. The optical encoder package recited in claim 1 wherein said detector comprises two data channels.

5. The optical encoder recited in claim 1 wherein said detector and said index detector comprise a plurality of elongated photodiodes, each elongated photodiode having an elongated axis that is parallel to an elongated dimension of the photodiode, the elongated axes of the detector and index detector photodiodes being parallel to each other.

6. The optical encoder recited in claim 5 wherein said detector and said index detector intersect a common axis and wherein the elongated axes of said detector and index detector photodiodes are parallel to the common axis.

7. The optical encoder recited in claim 5 wherein said detector and said index detector intersect a common axis and wherein the elongated axes of said detector and index detector photodiodes are perpendicular to the common axis.

8. The optical encoder recited in claim 5 wherein said emitter, said detector, and said index detector intersect a common axis.

9. An optical encoder comprising:
   an emitter adapted to emit light, the emitted light directed toward a code scale and an index code scale for reflection;
   a detector adapted to detect reflected light from the code scale;
   an index detector adapted to detect reflected light from the index code scale; and
   a baffle between said emitter and said detector to prevent stray light from said emitter from reaching said detector;
   wherein said optical encoder comprises an encapsulant forming a single-domed surface over said emitter, said detector, and said index detector, and wherein the emitter is located between the detector and the index detector.

10. The optical encoder recited in claim 9 wherein said emitter is one of the following: a slit emitter, and a circular emitter.

11. The optical encoder package recited in claim 9 wherein said detector comprises two data channels.

12. An optical encoder comprising:
   an emitter adapted to emit light, the emitted light directed toward a code scale and an index code scale;
   a detector adapted to detect light reflected from the code scale, said detector providing two data channels; and an index detector providing an index channel and adapted to detect light reflected from the index code scale;

wherein said optical encoder comprises an encapsulant forming a single-dome surface, wherein the detector and the index detector are located below opposite sides of the single-dome surface, and wherein the emitter is located below the single-dome surface and between the detector and the index detector.

13. The optical encoder recited in claim 12 wherein said emitter is one of the following: a slit emitter, and a circular emitter.

14. The optical encoder recited in claim 12 wherein said detector and said index detector comprise a plurality of elongated photodiodes, each elongated photodiode having an elongated axis that is parallel to an elongated dimension of the photodiode, the elongated axes of the detector and index detector photodiodes being parallel to each other.

15. The optical encoder recited in claim 14 wherein said detector and said index detector intersect a common axis and wherein the elongated axes of said detector and index detector photodiodes are parallel to the common axis.

16. The optical encoder recited in claim 14 wherein said detector and said index detector intersect a common axis and wherein the elongated axes of said detector and index detector photodiodes are perpendicular to the common axis.

17. The optical encoder recited in claim 14 wherein said emitter, said detector, and said index detector intersect a common axis.

* * * * *